United States Patent [19]

Hwang

[11] Patent Number: 4,693,687
[45] Date of Patent: Sep. 15, 1987

[54] APPARATUS FOR DETERMINING THE ACCELERATION OF A MOVING OBJECT UNDER GRAVITY

[76] Inventor: Ming-Chuen Hwang, No. 1-4, Lane 240, Chung San Road, Shan Hua Chen Tainan Hsien, Taiwan

[21] Appl. No.: 839,734
[22] Filed: Mar. 14, 1986
[51] Int. Cl.⁴ .............................................. G09B 23/08
[52] U.S. Cl. ..................................................... 434/302
[58] Field of Search ................................ 434/302, 300

[56] References Cited

U.S. PATENT DOCUMENTS

| | | | |
|---|---|---|---|
| 1,826,180 | 10/1931 | Klopsteg | 434/302 |
| 3,320,686 | 5/1967 | Blackburn | 434/302 |
| 3,520,981 | 7/1970 | Chambers | 434/302 |
| 3,629,957 | 12/1971 | Somashekar | 434/302 |
| 3,636,640 | 1/1972 | Chambers | 434/302 |

*Primary Examiner*—William H. Grieb
*Attorney, Agent, or Firm*—Birch, Stewart, Kolasch & Birch

[57] ABSTRACT

An improved appliance for instruction concerning the physical laws relating to the acceleration of a moving object under gravity includes an angle-adjustable slope body, a driving means for raising the slope body to a predetermined angle, a track way provided on the slope body, a moving object slidably riding on the track, and a gear mechanism with angle display where the angle of inclination of the track can be obtained from the angle display accurately to two decimal points. The appliance further includes three sensors corresponding with two timers for measuring the time needed for the moving object to slide a determined distance past the sensors, and a digital display for showing the results so that the acceleration of a moving object can be calculated accurately and easily from the data according to experiments done using the invention.

16 Claims, 22 Drawing Figures

APPARATUS FOR DETERMINING THE ACCELERATION OF A MOVING OBJECT UNDER GRAVITY

BACKGROUND OF THE INVENTION

The present invention relates to an improved appliance for instruction in a physics lab, particularly concerning an apparatus for determining the acceleration of an object under gravity which is improved with a digital timer, an angle adjusting and displaying device, and an electrical control device for obtaining more precise results. This improvement has operational and economic advantages over prior art devices.

In a physics lab, to obtain the value of various physical constants, and to establish the principles and laws of physics, several experimental instruments and steps are required. It is first necessary to give a precise meaning to each physical term used and to fix a unit of measurement for it. Instruments can be constructed to measure the physical quantities involved in a particular effect, and it may be finally determined from these measurements the relation which exists between those various quantities. The limit of validity of these laws is determined by the degree of precision attained in the measurements. In many instances improved measurements have indicated departures from previously established principles and have led to refinements in the laws or even to entirely new discoveries.

To find out the acceleration of a moving object under gravity is firstly to get a plurality of data concerning the time intervals during which the moving object passes through various predetermined distances, and then from the data of the time intervals and the distances, to calculate the acceleration of the moving object. The conventional appliances used in prior methods for obtaining the time interval data are complicated in their data-collecting operation and ensue discouraging errors in the practical results of the lab experiment.

SUMMARY OF THE INVENTION

With the above problems in mind, the main object of the invention is to provide a novel apparatus for determining the acceleration of a moving object under gravity to obtain precise data concerning the time intervals between the moments when a moving object passes through two predetermined locations.

An object of the invention is to provide an improved apparatus for determining the acceleration of a moving object under gravity which provides an adjustable elongated slope body for sliding the object down any angle of inclination to get more precise results.

Another object of the invention is to provide an improved apparatus for determining the acceleration of a moving object under gravity which provides an improved driving means to move the slope body to any desired angle of inclination or perpendicularity conveniently and easily.

In order to achieve the aforesaid objects as well as other incidental objects and advantages, the invention includes an elongated base having a rectangular hollow body; an angle adjustable elongated slope body with a top track having one of its ends pivotally connected to the elongated base through a pivot about which the slope body turns to changes its slope, a display means to show the angle of inclination of the slope body including a turnable indicator; a first, second and third photosensors movably provided in an orderly way above the top track way for sending a signal when the object passes therethrough, a moving object slidably provided on the top track under the photosensors; means for raising the elongated slope body to a predetermined angle relative to the elongated base for sliding the moving object past the three photosensors; gear mechanism cooperatively connected to the pivot to transmit the motion of the pivot to indicator; an indicating ruler provided along the top track way for measuring the distances between each of the photosensors to obtain the distances which the moving object travels in passes from sensor to sensor; and two digital timers for measuring time taken for the moving object to pass from first to second, and second to third sensors respectively, whereby the acceleration of the moving object can be computed accurately from the data concerning the distance the moving object travels and the time it needs to travel that distance by applying the rectilinear motion equation.

The acceleration of the object moving on an inclined surface at any angle of inclination or on a horizontal surface, can be computed accurately from the data provided from the apparatus concerning the time intervals and the distance that the moving object travels; the gravitational acceleration may also be ascertained.

BRIEF DESCRIPTION OF THE DRAWINGS

These and other advantages, objects and features of the present invention will become apparent from the following detailed description of the preferred embodiment with reference to the accompanying drawings, wherein.

DETAILED DESCRIPTION OF THE PREFERRED EMBODIMENT

The following is a detailed description of the best presently contemplated embodiment of the invention. This description is not to be taken in a limiting sense, but is made merely for the purpose of illustrating the general principles of the invention.

Figures 1A, 1B:
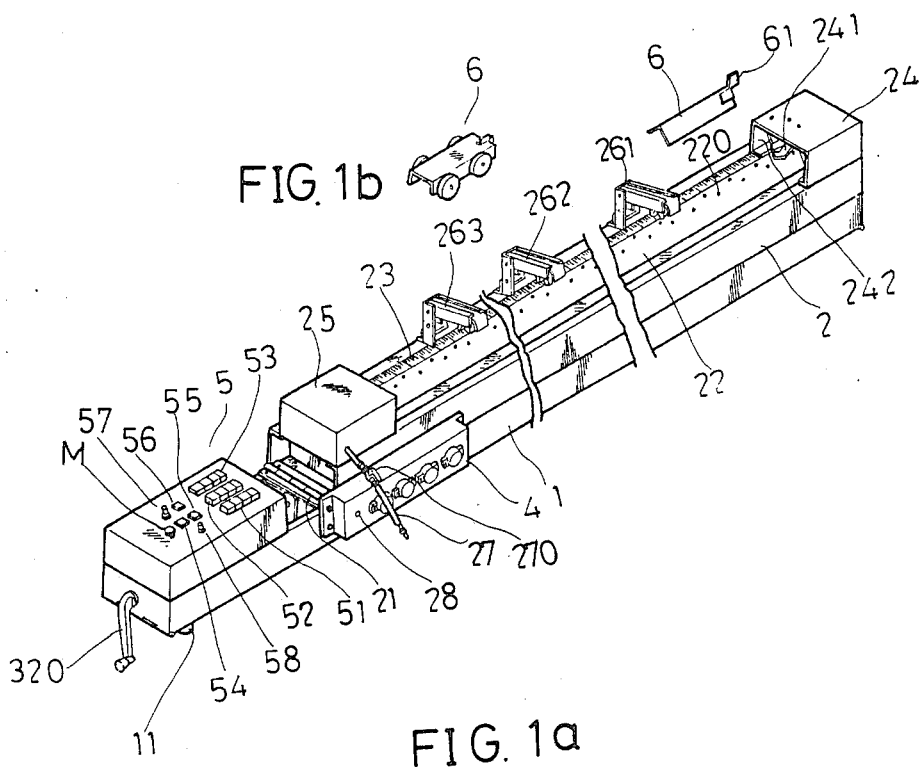
FIG. 1a is a perspective view of a preferred embodiment according to the invention.
FIG. 1b is a perspective of a wheeled moving object which can be used instead of the rider in FIG. 1.
Figure 2:
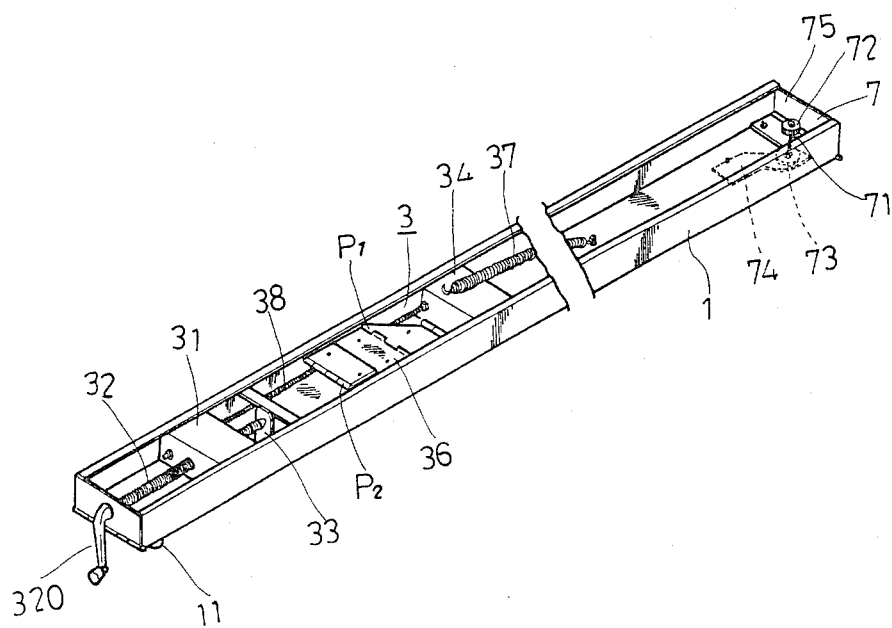
FIG. 2 is a perspective view of an elongated base showing a driving means provided in its rectangular hollow body for raising the elongated slope body (not shown in this figure)

Referring to FIG. 1a in conjunction with FIGS. 1b–4, the present invention includes an elongated base 1, an angle adjustable elongated slope body 2, a driving means 3 for raising the angle adjustable elongated slope body 2, a gear mechanism 4, an electrical controlling device 5 and a moving object 6.

A preferred embodiment of the invention is pictured in detail in FIGS. 1a–14. The elongated base 1 has a rectangular hollow body and a leg portion 11 provided at the bottom surface of one of its ends for supporting the base 1 on a horizontal table. A horizontal adjusting means 7 (see FIG. 2) is provided at the other end of the elongated base 1 for adjusting the elongated base 1 to be horizontal. The horizontal adjusting means 7 includes a threaded bolt 71 vertically passing through the bottom surface of elongated base 1. Two adjusting nuts 72, 73, are provided at the upper end and the lower end of the threaded bolt 71 respectively so that the nut 72 is provided in the hollow body and the nut 73 is provided under the bottom surface of the base 1. A cushioning plate 74 is provided on the bottom of the base 1, with one of its ends fixed to the bottom surface and the other end cushioned under the nut 73 for preventing the surface of the table being scratched by the outside end of the threaded bolt 71. The cushioning plate 74 also can balance the elongated base 1 if an undesired depression is located on the surface of the table just beneath the horizontal adjusting means 7. A door plate 75 is pivotally provided at the end of the hollow body of the elongated base 1 adjacent to the horizontal adjusting means 7. The door plate 75 can be opened and the elongated base 1 can be balanced to a horizontal position by adjusting the nut 72 of the horizontal adjusting means 7.

The driving means 3 for driving the adjustable elongated slope body 2 is provided in the hollow body of the elongated base 1. (See FIG. 2.). The driving means 3 includes first and second movable members 31, 34 which are separately mounted in the elongated base in a horizontally movable position; the second movable member 34 is provided under the slope body 2 and the first movable member 31 is provided at one end of the elongated base 1 adjacent to the leg portion 11. A threaded handling rod 32 has a handle portion 320 at one of its ends outside the hollow body of the elongated base 1 and the other end passes through the first movable members 31. A blocking plate 33 is provided between the first and second movable member 31, 34 and fixed at a predetermined position in the hollow body for blocking the first movable member 31 from moving too far forward when the threaded handling rod 32 is driven manually by the handle portion 320. The two movable members 31, 34 are connected by a threaded elongated rod 38 so that the second movable member 34 can move toward the first movable member 31 on the threaded portion of the threaded elongated rod 38 if the handling rod 32 continues to be driven after the first movable member 31 is blocked by the blocking plate 33.

The driving means 3 further includes a lifting arm provided between the two movable members 31, 34 for lifting the slope body 2 at the predetermined angle. The lifting arm includes first and second supporting portions 35, 36 hinged each other to form a first force acting point P1, wherein the first portion 35 is fixed to the second movable member 34 and the second portion 36 is pivotally engaged to the slope body 2 to form a second force acting point P2 when the second movable member 34 is moved toward the first movable member 31. The combination of acting points P1, P2 reduces the manual driving force needed on the handle portion 320 during its operation. The supporting means further includes a retaining spring 37 connected to the elongated base 1 and the slope body 2 for reducing the vibration of the slope body 2 when it is raised by the supporting means. Each of the two portions 35, 36 further includes a projecting portion 350, 360; respectively portions on its bottom surface, which may abut together when the two portions 35, 36 are opened to approximately 180 degrees through the pivotted portion of P1. (See FIGS. 2 and 3)

Figure 3:
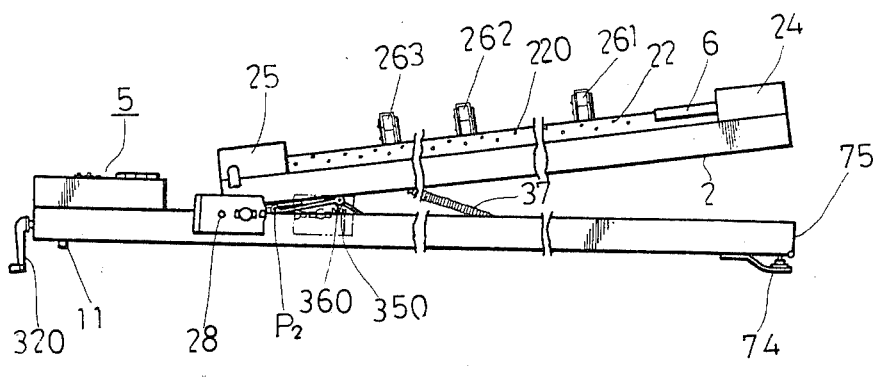
FIG. 3 is a side view of FIG. 1a showing the elongated slope body raised at a certain angle of inclination.
Figure 4:
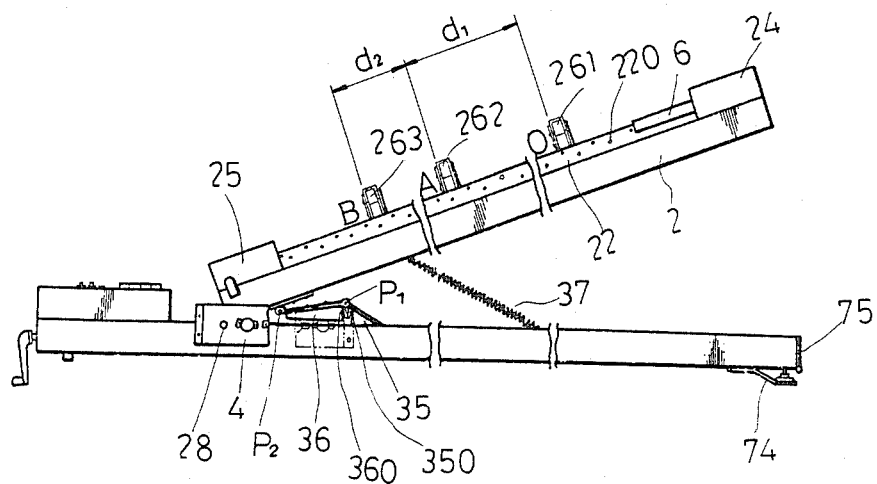
FIG. 4 is a side view of FIG. 1a showing the elongated slope body raised to a different angle of inclination from that of FIG. 3.
Figure 5:
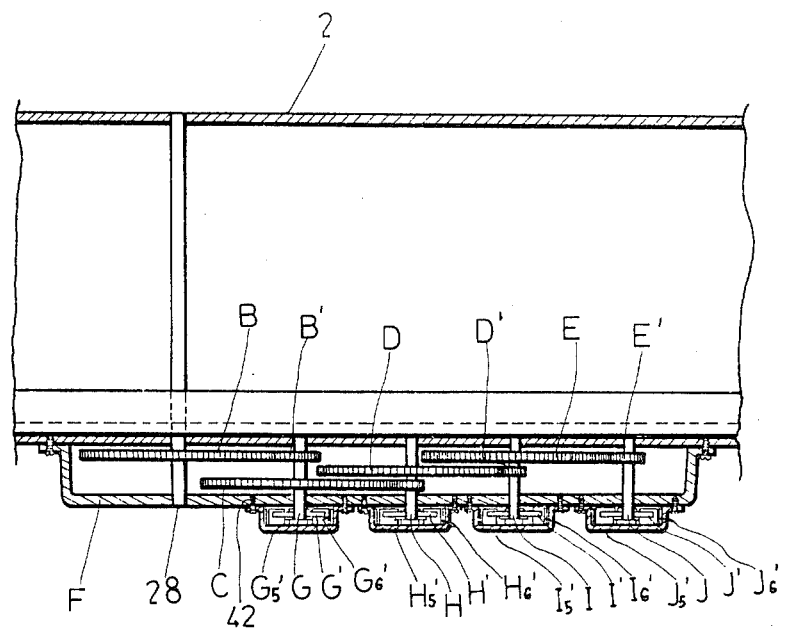
FIG. 5 is a top cross-sectional view of a gear mechanism cooperatively connected to the pivot about which the slope body turns to change its angle of inclination, to transmit the motion of the pivot to an indicator.
Figure 6:
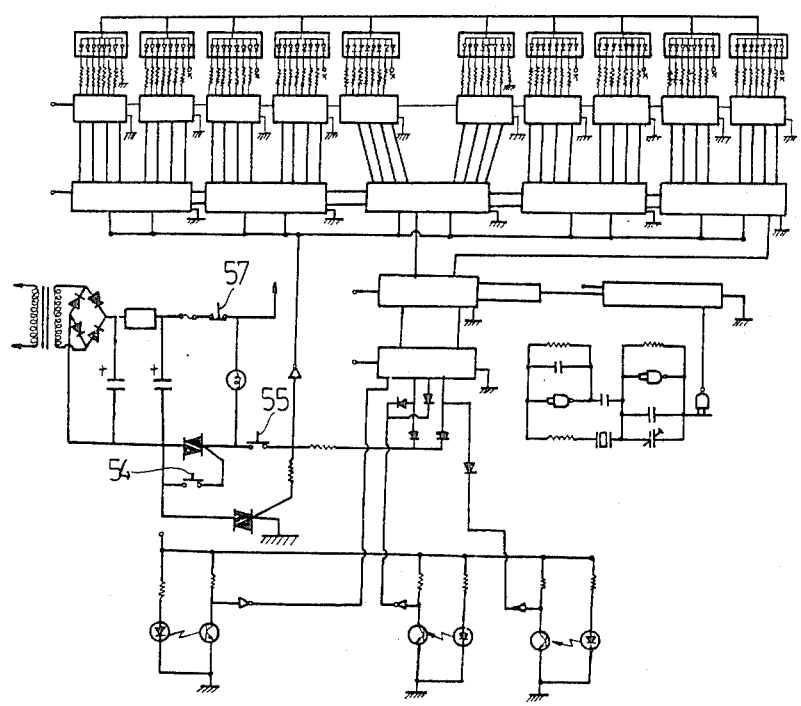
FIG. 6 is an electric circuit of the digital timer means which is actuated by the photosensors.

When the slope body 2 is raised by the supporting means from its horizontal position, the first force acting point P1 supports the slope body 2 at the pivotted portion of the two portions 35, 36 of the supporting means (See FIG. 3). After the slope body is raised to a certain slope angle of about 20 degrees, the two portions 35, 36 of the supporting means are connected in a straight line relative to each other so that the two projections 350, 360 abut against each other and the supporting means for the slope body 2 is provided at the second force acting point P2. The slope body 2 can be conveniently raised and supported by the supporting means to any desired angle in 0–90 degree range through the above-described mechanism.

The angle adjustable slope body 2 is a rectangular elongated body corresponding to the elongated base 1 in size and shape but a little shorter in length. The slope body 2 is pivotally connected to the elongated base 1 through hinge 21 and a pivot 28. A track way 22 having a top surface of an inverted V-shaped cross section is provided on the slope body 2. A plurality of holes 220 are spread over the inverted V-shaped top surface of the track 22. An indicating ruler 23 is provided along the track way 22. The moving object, a rider 6 with an upward tail projection 61, is slidably placed on the track way 22.

An electromagnetic retaining means 24 is provided at one end of the track way 22 for retaining the rider 6 before it slides past the three photosensors 261, 262, 263. (See FIG. 1a). The retaining means 24 is a housing having an inner upwardly bent wall 242 and an electromagnetic retaining plate 241 provided at the upper inner portion of the housing, wherein the tail projection 61 of the rider 6 can be clamped by the inner upwardly bent wall 242 and electromagnetic retaining plate 241. An absorber 25 is provided at the other end of the track 22 away from the electromagnetic retaining means 24 for absorbing the impact of the rider 6 when it reaches the absorber 25.

Figure 9:
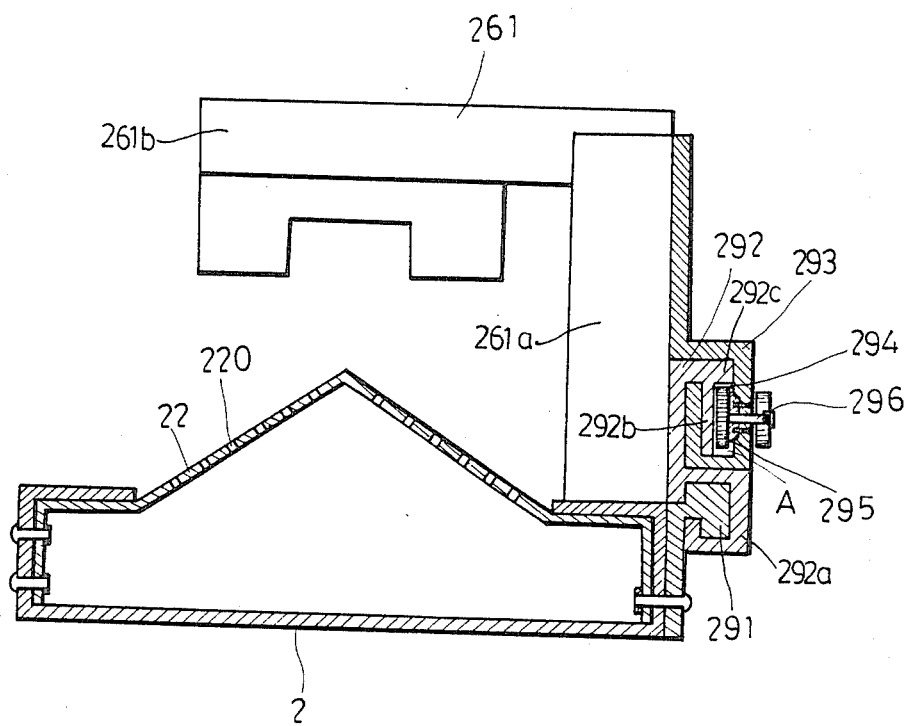
FIG. 9 is a cross-sectional view of a photosensor slidably provided along the track way according to the invention.
Figure 10:
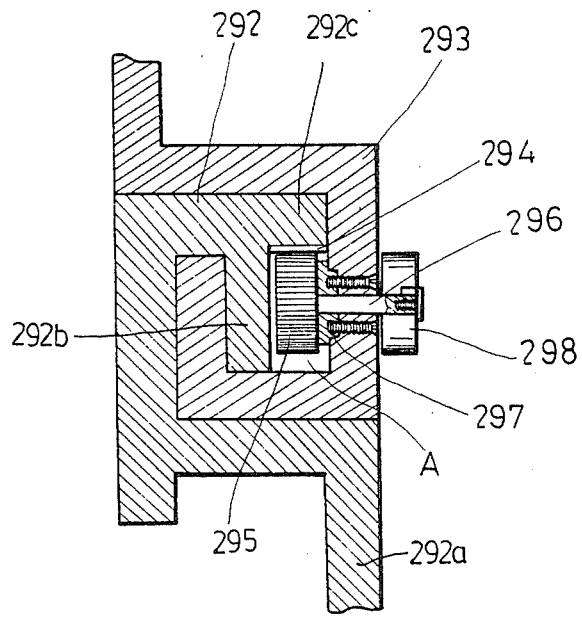
FIG. 10 is an enlarged cross-sectional view of the connecting portion of the photosensor and the track way showing how the photosensor is slidably provided along the track way and set at a predetermined position.
Figure 11:
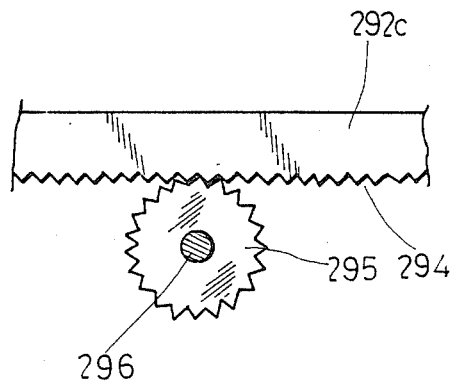
FIG. 11 is a schematic view of an adjusting gear which engages with the photosensor for adjusting the position of the photosensor along the track way.
Figure 12:
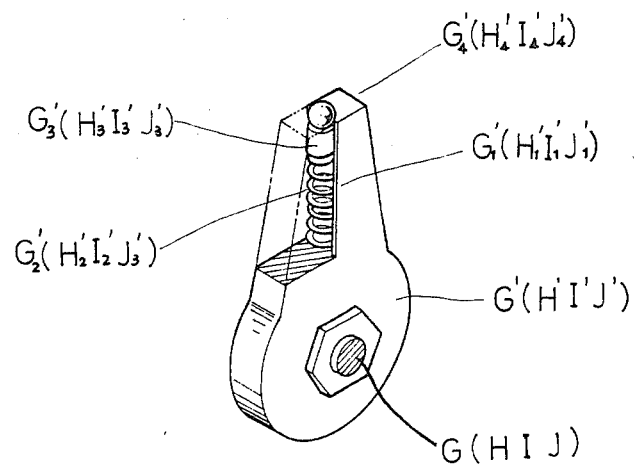
FIG. 12 shows a contacting means of the gear assembly of FIG. 5.
Figure 14:
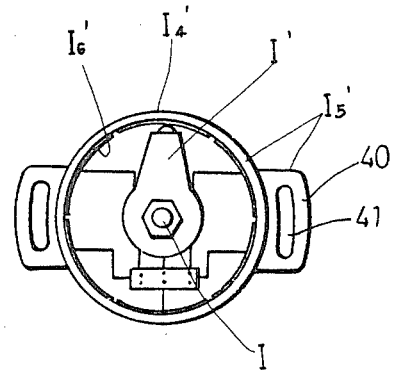
FIG. 14 is a schematic view of the cover member provided on the contacting means showing the contacting arrangement of the conducting plates and the contacting means.
Figure 13:
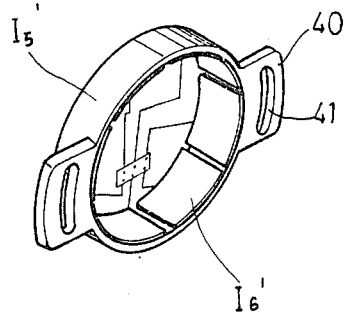
FIG. 13 is a perspective view of an annular cover member having a plurality of conducting plates provided along its inner surface according to the invention.

FIGS. 9-11 shows the arrangement of the photosensors 261, 262, 263 connected with the track 22. A guide way 291 is provided along the elongated slope body 2. Each of the photosensors has a slidable supporting base 292 which is slidably provided on the guide way 291. The slidable supporting base 292 has a groove portion 292a slidably engaged with the guide way 291 and an upper downwardly bent portion 292b. Each of the photosensors has a leg portion 261a, 262a, 263a which is provided with a hook member 293 which cooperates with the downwardly bent portion 292b of the slidable supporting base 292 so that the photosensor is slidable in a longitudinal direction along the slidable supporting base 292. The downwardly bent portion 292b of the slidable supporting base 292 further includes a flange 292c having a toothed surface 294 along its bottom surface. A space "A" is formed between the flange 292c and the hook member 293. The hook member 293 further includes a micro-adjusting means having a pivot 296 passing into the space A across a fixed base 297, a small pinion 295 provided in the space A and connected with one end of the pivot 296, and an adjusting knob 298 provided at the other end of pivot 296 outside the space A. The pinion 295 is engaged with the toothed surface 294 of the flange 292b. The photosensors can be moved to a predetermined position by sliding the slidable supporting base 292 and the precise location of the photosensors in the micro-range can be adjusted by the knob 298. Each of the sensing means 261, 262, 263 further includes an arm portion 261b, 262b, 263b which is provided over the track 22 and which has a sensing device on it.

An air inlet conduit 27 with a control valve 270 is connected with the track 22, wherein one end of the inlet conduit 27 is adapted to connect to a blower for blowing air into the hollow portion of the track 22 to form an air cushion over the top surface of the track way 22 as the blowing air passes out the plurality of holes 220, decreasing the friction as the rider 6 slides on the track 22.

The gear mechanism 4 is provided along the elongated base 1 including a plurality of shafts G, H, I, J rotatably provided outside the elongated base 1 and parallel to the pivot 28. (See FIG. 5). The pivot 28 extends out of the base 1 and a driving gear B is provided on the extending portion of the pivot 28. The gear mechanism 4 further includes a plurality of pinions B', C', D', E', and a plurality of transmission gears C, D, E which are in an arrangement that pinion B' can be driven by the driving gear B if the slope body 2 is raised up to any slope angle by the supporting means 35, 36. The transmission gear C is provided on the same shaft G with the pinion B'; D and C' on the same shaft H; E and D' on the same shaft I and the pinion E' on the last shaft J. Pinions C', D', E' are engaged with the transmission gear C, D, E respectively and the gear ratios are B:B'=4:1, C:C'=9:1, D:D'=10:1, E:E'=6:1, so that the rotation of the pivot 28 can be transmitted to each shaft G, H, I, J according to the gear ratios. A cover F is provided on the gear assembly 4 and the shafts G, H, I, J extend out of the cover F. Each of the shafts G, H, I, J has a contacting means G', H', I', J' at its ends having a deep bore G1', H1', I1', J1' in which are provided a biasing spring G2', H2', I2', J2', cushioning piece G3', H3', I3', J3', and ball G4', H4', I4', J4'. (See FIG. 12). An annular cover G5', H5', I5', J5' each of which has a segmented conducting plate G6', H6', I6', J6' covering the contacting means G', H', I', J' wherein the spring biased ball may contact the conducting plates. (See FIG. 13, 14).

The segmented conducting plate G6' of annular cover G5' has 9 divisions as indicated (0-8), similarly segmented conducting plate H6' of H5' has 10 divisions (0-9), segmented conducting plate I6' of I5' has 6 divisions (0-5), and segmented conducting plate J6' of J5' has 10 divisions (0-9). (See FIG. 7). Each of the annular covers further includes two lugs 40 with slot 41 and connected to the casing F through a screw 42.

Figure 7:
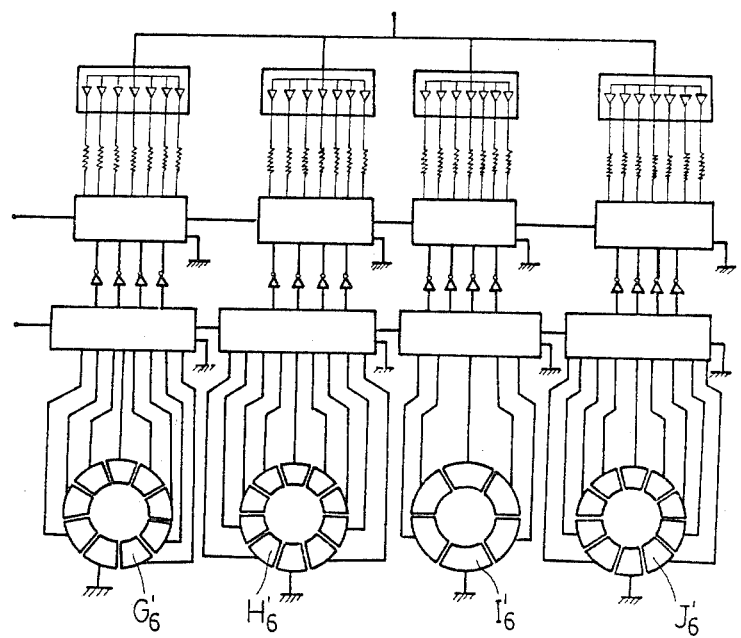
FIG. 7 is another electric circuit and digital display which is provided on the elongated slope body for showing the angle of inclination of the track way.
Figure 8:
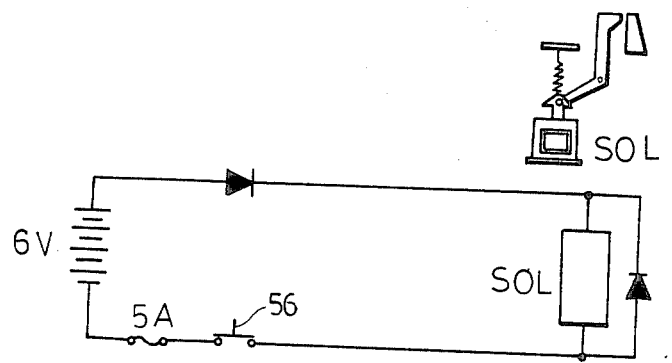
FIG. 8 is an electric circuit of the alectromagnetic retaining means for retaining the moving object before it slides down along the track way.

The gear mechanism 4 further includes an angle digital display 53 which is connected with each of the conducting plates of the annular cover G5', H5', I5', J5' through an electrical circuit as shown in FIG. 7. By the above-mentioned arrangement of the gear mechanism 4, the slope angle of the slope body 2 is displayed in the digital display 53 in four digit numbers, two of which are unit numbers and the rest of which are in decimal point numbers so that the value of the slope angle may be shown accurately up to two decimal point numbers.

The gear mechanism 4 and display 53 work as follow:

If the slope body 2 is raised up 1 degree by the supporting means 35, 36, the pivot 28 rotates 1 degrees and the shaft G rotates 4 degrees according to the gear ratio B:B'=4:1. The conducting plate G6' of the annular cover G5' has 9 divisions so that one division stands for 40 degrees. (i.e., the contacting means G' will not pass first division of conducting plate G6', and in other words, the digital display 53 will continue to display "0" in the 10's column of the real number display). Similarly, the shaft H may rotate to 36 degrees according to the gear ratios B:B'=4:1 and C:C'=9:1. The segmented conducting plate H6' of the annular cover H5' has 10 divisions so that one division stands for 36 degrees. (i.e., the contacting means H' will pass the first division of conducting plate H6', and the digital display 53 will show "1" in the 1's column of the real number display. The shaft I will rotate 360 degrees according to the gear ratios D:D'=10:1; that would cause the contacting means I' to rotate completely around and back to its initial "0" position. Therefore, "0" would be shown in the first decimal point number position on the digital display 53. Similarly, the shaft J will rotate 2160 degrees according to the gear ratio E:E'=6:1. (i.e., the contacting means rotates six times around and returns to its initial "0" position.). Therefore, if the slope body 2 is raised by 1 degree, the display 53 shows 0100 (01.00 degree). In such way, any angle of inclination (0-90 degrees) of the slope body 2 or track 3 can be seen in the display 53 precisely and conveniently.

The electrical controlling device 5 is provided on the elongated base 1 with two timer digital displays 51, 52, power source OFF button 54, counter reset 55, power line indicating light 58, electromagnetic retaining switch 56, and power source ON button 57. (FIG. 1a).

When in use, the rider 6 is placed on the track 22 and then the air inlet valve 270 is turned on. If the rider does not move on the air cushion, it means that the elongated base 1 is in a horizontal position. If not, the elongated base 1 can be adjusted to a horizontal position by adjusting the horizontal adjusting means 7.

The tail portion 61 of the rider 6 can be clamped between the bent wall 242 and the electromagnetic retaining plate 241. Three photosensors 261, 262, 263 are set in an orderly fashion at predetermined locations O, A, B. The distance d1, d2 between OA, AB can be obtained from the indicating ruler 23. (See FIG. 1a). The slope body 2 can be raised to a predetermined angle by rotating the handle portion 320. The angle of inclination of the slope body 2 or track 22 can be noted from the angle display 53. The rider 6 may be allowed to slide down by switching on the electromagnetic retaining switch 56 so that the electromagnetic retaining plate 241 detaches from the tail portion 61 and releases the rider 6.

When the rider 6 passes under photosensor 261 (point O), a first signal pulse is actuated from the sensor 261 and the timer 51 starts to measure the time passing after the rider travels from point O. When the rider passes under sensor 262, a second signal pulse is actuated and the timer 51 stops its measurement. Simultaneously, the timer 52 starts to measure the time passing after the rider 6 travels from point A and stops when the rider 6 passes under the sensor 263.

The time intervals t1, t2 that the rider 6 travels for the distance d1, d2 can be obtained accurately and easily from the timers 51, 52. Then the corresponding velocity V1, V2 can be calculated using the equations as follows: $V1=d1/t1$, $V2=d2/t2$, $t=t1+t2/t$. Then, Average acceleration of the rider $a=V2-V1/2$.

The following data were obtained from a laboratory experiment by using the appliance of this invention.

| $\theta$(degrees) | d1(cm) | d2(cm) | t1(sec) | t2(sec) |
|---|---|---|---|---|
| 30 | 30 | 30 | 0.181 | 0.125 |
| 45 | 35 | 30 | 0.185 | 0.104 |
| V1 = d1/t1(cm/sec) | | V2 = d2/t2(cm/sec) | t = t1 + t2/2(sec) | |
| 165.75 | | 240 | 0.153 | |
| 189.19 | | 288.46 | 0.1445 | |
| a = V2 − V1/t(cm/sec$^2$) | | | g (cm/sec$^2$) | |
| 485.29 | | | g = 2a = 970.588 | |
| 686.99 | | | g = 2a = 971.541 | |

The value "g" calculated from the results of this invention approximate the physical constant value "g=980 cm/sec$^2$" so it is shown that the degree of precision attained by the improved appliance is more satisfactory than that of the prior arts.

Figure 15:
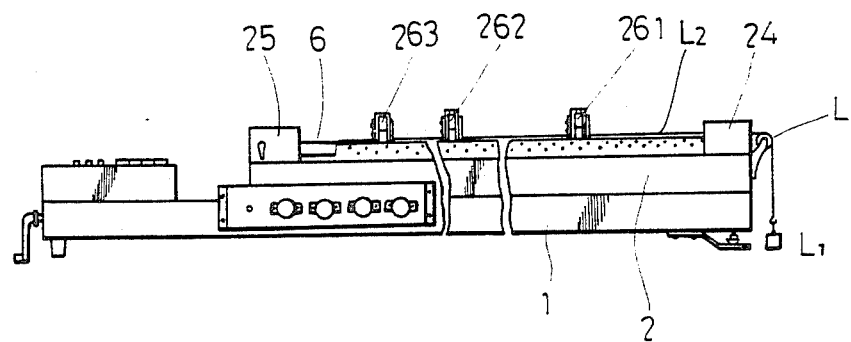
FIG. 15 is a perspective view of another preferred embodiment showing the moving object in a horizontal moving position according to the invention.

FIG. 15 shows a second preferred embodiment of the invention for obtaining an average acceleration of a horizontal moving object under gravity. In this experiment, the slope body 2 is placed horizontally. The rider 6 rides on the track 22 adjacent to the absorber 25. A flexible cord L2 is attached to the rider 6 and extends longitudinally to the other end of the track 22, passing through the retaining means 24, over a frictionless pulley L, and being attached to a weight block L1.

Figure 16:
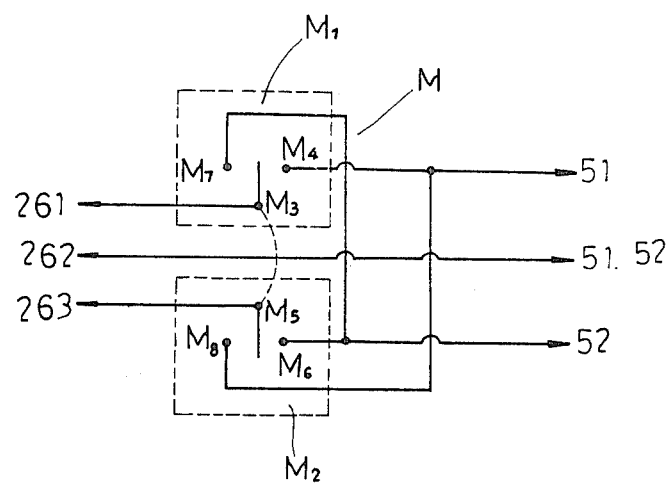
FIG. 16 is an electric circuit of a double throw switch of an arrangement by which the sequence of the photosensors can be changed before the time interval of the moving object passing from one sensor to the other is measured, as the direction of the moving object is changed.

FIG. 16 shows an electrical circuit of a double throw switch M which has an arrangement to change the sequence of the sensors 261, 262, 263 before the time interval of the passage of the rider 6 from one sensor to another is measured. Means M1, M2 are connected to each other so they can be operated simultaneously. If M3 and M5 connect with M4 and M6 respectively, the timers 51, 52 can measure the time interval from sensors 261 to 262, and 262 to 263 respectively. If the switch M is turned on in another direction by M1 and M2 so that M3 and M5 connects with M7 and M8 respectively, then the timer 51, 52 may measure the time intervals from the sensors 263 to 262, 262 to 261 respectively.

In the second experiment, the rider 6 slides along the track 22, passing through sensors 263, 262, 261 consecutively, so that the time intervals T1, T2 corresponding to the distance from sensors 263 to 262, and 262 to 261 can be obtained from timer 51 and 52 accurately and easily. From the data of the second preferred embodiment, the average acceleration of the rider 6 a' can be obtained by calculation.

By Newton's Second Law
$a=F/m$
F = The weight of the body L1
m = mass of the body L1 + mass of the rider 6
$m=m1+m2$ The degree of the precision of the invention can be proved again by the second preferred embodiment upon comparing the value "a" and "a'", which are approximately equal.

Figure 17A:
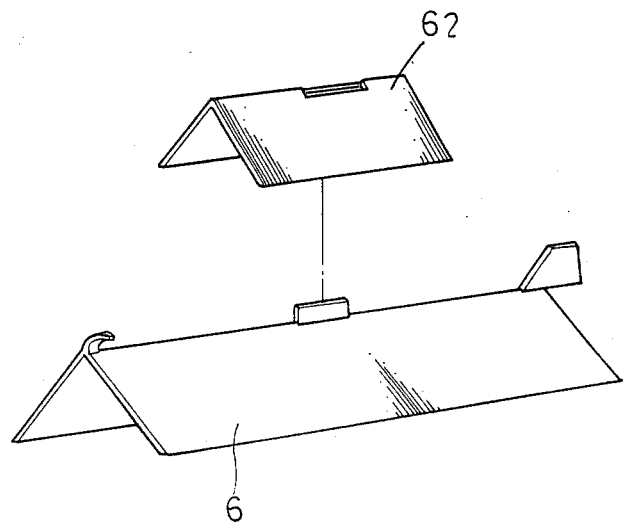
FIG. 17a is a perspective view of the rider with a coupling piece added for increasing its weight.
Figure 17B:
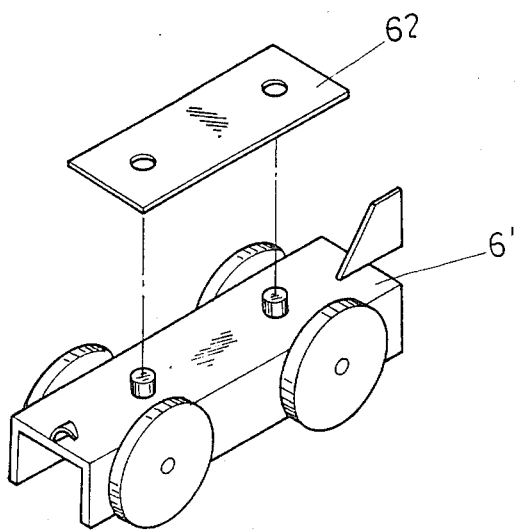
FIG. 17b is a perspective view of the wheeled moving object with another coupling piece added for increasing its weight.

FIG. 17a, 17b show the moving objects with coupling pieces 62 for changing their weight to obtain an even more accurate result from the second preferred embodiment.

Figure 18:
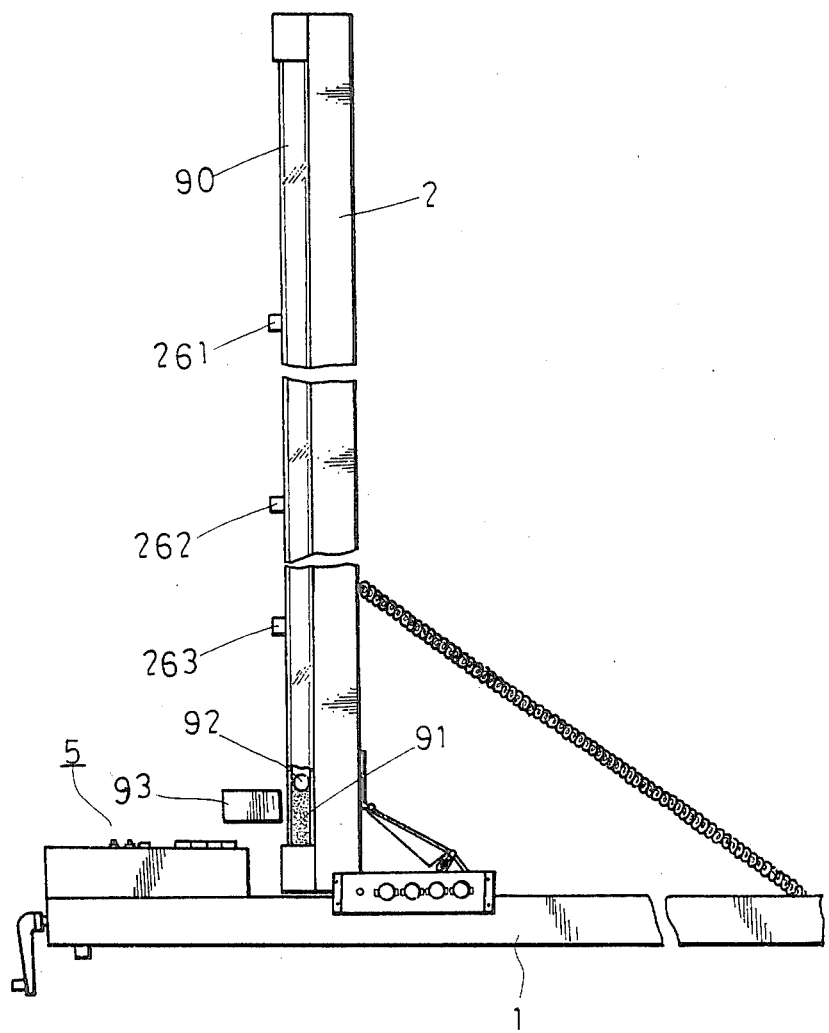
FIG. 18 is a further preferred embodiment showing the elongated slope body raised to a perpendicualr position by the driving means according to the invention.

FIG. 18 is a third preferred embodiment of the invention for finding the physical constant value "g" or the acceleration of a free-falling object. In this experiment, the slope body 2 is first raised upwardly by the driving means 3 and supporting means. Track 22 can be replaced by a transparent hollow vacuum tube 90 which has a small metal ball 92, and an impact absorber 91 at its bottom portion. The ball 92 can be raised to the top portion of the tube 90 using a magnetic piece 93. The ball 92 can fall down freely in the vacuum when the magnetic piece 93 is taken away.

Figure 19:
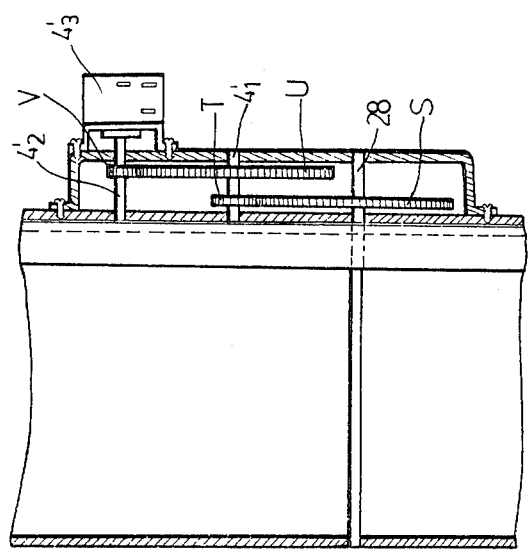
FIG. 19 is another angle adjusting device which can be used instead of the gear assembly of FIG. 5 according to the invention.
Figure 20:
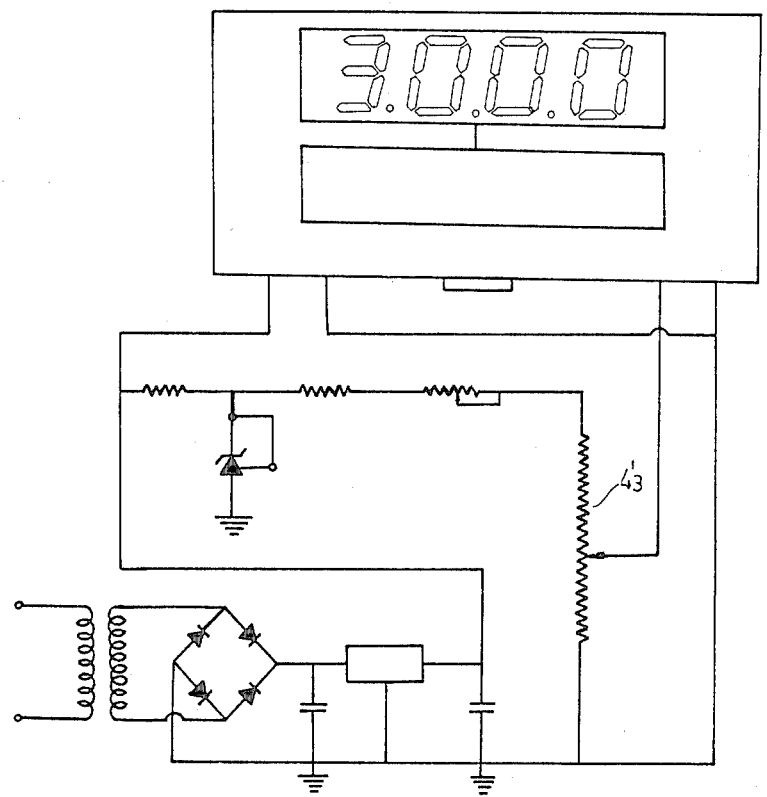
FIG. 20 is an electric circuit of the angle adjusting device of FIG. 19 with a digital display for showing the angle of inclination of the elongated slope body.

FIG. 19 is another angle adjusting gear mechanism 4' and FIG. 20 is the electric circuit of FIG. 19 connected to the angle display 53. In this arrangement, the driving gear S is provided on the pivot 28. Pinion T and transmission gear U are provided on the shaft 4'1, and pinion V is provided on the extending shaft 4'2 of a variable resistor 4'3. The ratios of the pinions and gears are S:T=8:1, U:V=5:1. Therefore, if the pivot 28 rotates completely around, the shaft 4'2 of the resistor 4'3 can be driven 40 times around according to the gear ratio. The resistance of the resistor 4'3 is variable according to the rotation of the shaft 4'2.

While this invention has been described with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims, which scope is to be accorded the broadest interpretation so as to encompass all such modifications and equivalent structures.

What I claim is:

1. An improved apparatus for determing the acceleration of a moving object under gravity comprising:
   an elongated hollow base;
   an angle-adjustable slope body with a top track way, pivotally connected to said base through a pivot about which said slope body turns to change its angle of inclination;
   at least three sensors movably provided in an orderly manner above said top track way for sending a signal when said moving object passes therethrough;
   means for driving said angle adjustable slope body to a predetermined angle relative to said elongated base for sliding said moving object down to pass said three sensors;
   a display means to show said angle of inclination of said slope body, including a turnable indicator;
   a gear mechanism cooperatively connected to said pivot to transmit the motion of said pivot to said indicator;
   an indicating ruler provided along said top track for measuring the distance between each of said sensors; and
   a timer means responsive to the signals from said sensors for measuring the time interval required by said moving object to pass from one of said sensors to another sensor, wherein the acceleration of said moving object can be computed from each said corresponding distance of said sensors and said time intervals.

2. An improved apparatus as claimed in claim 1, wherein said driving means includes:
   movable means mounted in said elongated base in a horizontal moving position;
   a lifting arm connected to said movable means and said slope body; and
   threaded rod means connected to said movable means and mounted in said base for rotation about a horizontal axis by manual operation so as to move said movable means towards and away from said pivot.

3. An improved apparatus as claimed in claim 2, wherein said movable means includes a first and a second movable member movably received in said base, each of which is separated so that said second movable member is provided under said slope body, and said first movable member is adjacent to one end of said elongated base.

4. An improved apparatus as claimed in claim 2, wherein said lifting arm includes a first and second portions hinged to each other.

5. An improved apparatus as claimed in claim 2, wherein said driving means further includes a blocking plate provided between said first and second movable members, and fixed at a predetermined position for blocking said first movable member from moving forward, and said threaded rod means includes a threaded handling rod passing through said first movable member, wherein one end of said handling rod has a handle portion provided outside of said elongated base for driving said handling rod manually, and a threaded elongated rod connecting said first and second movable members so that said second movable member may move toward said first movable member through said threaded elongated rod when said handling rod continues to be driven after said first movable member is blocked by said blocking plate.

6. An improved apparatus as claimed in claim 1, in which said track way is a hollow elongated body having a top surface of inverted V-shaped cross section, provided on said slope body, wherein the apparatus further includes a moving object in the form of a rider having an inverted V-shaped cross section corresponding to said top surface of said track way and able to be movably overlaid on said track way.

7. An improved apparatus as claimed in claim 6, wherein said moving object is a wheeled body.

8. An improved apparatus as claimed in claim 6, in which said track way further includes an air inlet conduit connecting to said track way and a plurality of holes spread along said top surface of said track way, wherein said air inlet conduit is adapted to connect with a blower for blowing air into said hollow elongated body of said track to form an air cushion on said top surface of said track way, when the blowing air passes out of said plurality of holes so that said rider can slide on said track way with reduced friction.

9. An improved apparatus as claimed in claim 1, wherein said track way further includes an electromagnetic retaining means provided at one end of said track for retaining said moving object before it slides past said three sensors.

10. An improved apparatus as claimed in claim 9, wherein said track further includes a shock absorber at the other end of said track from said electromagnetic retaining means for absorbing the impact of said moving object when it reaches said shock absorber.

11. An improved apparatus as claimed in claim 1, wherein said three sensors are photosensors.

12. An improved apparatus as claimed in claim 1, wherein said gear mechanism provided along said elongated base includes:
    a driving gear mounted on said pivot;
    a plurality of shafts mounted on said elongated base parallel to said pivot, each of which bears one said turnable indicator;
    a plurality of pinions mounted on said shafts respectively, one of said pinions being meshed with said driving gear; and
    a plurality of transmission gears mounted on said shafts respectively and meshed with said pinions respectively.

13. An improved apparatus as claimed in claim 12, wherein said display means further includes a digital display member, an electronic circuit to be connected to said digital display member, including a plurality of segmented conducting plates annularly disposed around each of said turnable indicators; each of said turnable indicators being electrically connected to said circuit and having a electrical contacting end to contact with said conducting plates.

14. An improved apparatus as claimed in claim 1, wherein said sensors further include a double throw switch to allow the sequence of the sensors' signals to be changed according to the direction of said moving object, before said time interval of the passage of said moving object from sensor to sensor is measured.

15. An improved apparatus as claimed in claim 1, wherein said moving object further includes a coupling piece for varying its mass.

16. An improved apparatus as claimed in claim 1, in which said track way is transparent vacuum tube having a small metal ball therein, and said small metal ball can be raised by using a magnetic body for finding out the acceleration of a free falling object.

* * * * *